US008639926B2

(12) United States Patent  
Brown et al.

(10) Patent No.: US 8,639,926 B2  
(45) Date of Patent: Jan. 28, 2014

(54) TECHNIQUES FOR MOBILE DEVICE AUTHENTICATION (75) Inventors: Jeremy Ray Brown, Orem, UT (US); Jason Allen Sabin, Lehi, UT (US); Nathaniel Brent Kranendonk, Springville, UT (US); Kal A. Larsen, Springville, UT (US); Lloyd Leon Burch, Payson, UT (US)

(73) Assignee: Novell, Inc., Provo, UT (US)

( * ) Notice: Subject to any disclaimer, the term of this patent is extended or adjusted under 35 U.S.C. 154(b) by 237 days.

(21) Appl. No.: 12/915,816

(22) Filed: Oct. 29, 2010

(65) Prior Publication Data

US 2012/0110329 A1 May 3, 2012

(51) Int. Cl.
*H04L 29/06* (2006.01)

(52) U.S. Cl.
USPC .......... 713/168; 726/1; 726/2; 726/4; 726/26; 726/34; 726/35; 715/780; 713/193; 713/194; 455/411

(58) Field of Classification Search
USPC ............ 713/168, 193, 194; 726/4, 1, 2, 7, 26, 726/34, 35; 715/780; 455/411
See application file for complete search history.

(56) References Cited

U.S. PATENT DOCUMENTS

| 7,016,666 B2 | 3/2006 | Lauper et al. |
| 7,606,560 B2 | 10/2009 | Labrou et al. |
| 2007/0283431 A1* | 12/2007 | Ueda ............................. 726/19 |
| 2008/0289030 A1* | 11/2008 | Poplett ........................... 726/15 |
| 2008/0307515 A1* | 12/2008 | Drokov et al. .................. 726/7 |
| 2010/0022254 A1 | 1/2010 | Ashfield et al. |
| 2010/0024017 A1 | 1/2010 | Ashfield et al. |
| 2010/0197293 A1 | 8/2010 | Shem-Tov |
| 2011/0202466 A1* | 8/2011 | Carter ............................ 705/67 |
| 2011/0271331 A1* | 11/2011 | Adams ............................ 726/6 |
| 2011/0277025 A1* | 11/2011 | Counterman ................... 726/8 |
| 2011/0289564 A1* | 11/2011 | Archer et al. .................... 726/5 |
| 2012/0084563 A1* | 4/2012 | Singhal ........................ 713/168 |

* cited by examiner

*Primary Examiner* — Brandon Hoffman  
*Assistant Examiner* — Hee Song  
(74) *Attorney, Agent, or Firm* — Schwegman Lundberg & Woessner, P.A.

(57) ABSTRACT

A user authenticates a mobile device (MD) to a network-based service (NBS) for initial authentication. Policy is pushed from the NBS to the MD and the MD automatically obtains details about devices and attributes that are near or accessible to the MD in accordance with the policy. The details are pushed as a packet from the MD to the NBS and multifactor authentication is performed based on the details and the policy. If the multifactor authentication is successful, access privileges are set for the MD for accessing the NBS and perhaps for accessing local resources of the MD.

19 Claims, 4 Drawing Sheets

TECHNIQUES FOR MOBILE DEVICE AUTHENTICATION

BACKGROUND

Mobile device (e.g., tablets, personal digital assistants (PDAs), phones, etc.) ownership and usage have skyrocketed in the last decade and continues to grow at near exponential rates. Parents have bought phones for small children; individuals considered poor by economic standards possess phones; just about everyone classified as not being poor possess phones; and phone ownership spans the globe and is not tied to any particular country.

The security of mobile devices is difficult to manage. These devices can be lost, stolen or used without the owner's permission. Once the device is stolen, the thief has complete control over the device. This may allow passwords and Personal Identification Numbers (PINs) to be hacked. This can expose the contents of the device and expose any use of the device to a hacker.

More and more these mobile devices are being used to manage and control cloud resources and systems. For example, mobile devices are quickly becoming the face to Intelligent Workload Management (IWM). In the past, additional security for devices that control IWM could be locked down to physical or network locations, but this is not possible with these mobile devices. Part of the value of a portable mobile device is that it can be used from almost anywhere and at anytime. Once control of one of these devices is lost the entire management of an IWM system may be at risk.

Furthermore, passwords entered on a mobile device may not be enough to protect an entire IWM system. There has been some effort to use multifactor authentication to solve some of the above-referenced problems, but the approaches taken heretofore have only moved the security burden to the owner of the device because mobile devices have limited keyboards and screen sizes.

Also, anything used to authenticate the user, which is on the mobile device, is susceptible to landing in the hands of a thief that appropriates the mobile device and is therefore capable of being compromised.

SUMMARY

Techniques for mobile device authentication presented. More particularly, and in an embodiment, a method for mobile device authentication is described. Specifically, a mobile device for a user is initially authenticated a first time and policy is acquired that defines information, which the mobile device is to collect for multifactor authentication. Next, the policy is dynamically pushed to the mobile device and then the information is received from the mobile device, which the mobile device collected without interaction from the user based on the policy and at least some of the information external to the mobile device. Finally, authentication is performed a second time using the received information.

DETAILED DESCRIPTION

A "resource" includes a user, service, system, device, directory, data store, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

A "workload" as used herein refers to a special type of resource, such as a Virtual Machine (VM), an Operating System (OS), a cloud, a hardware device, an agent, and an application.

"Intelligent Workload Management" (IWM) is an emerging architecture for Information Technology (IT) systems' management arising from the intersection of dynamic infrastructure, virtualization, identity management, and the discipline of software appliance development. IWM enables the management and optimization of computing resources in a secure and compliant manner across physical, virtual and cloud environments to deliver business services for end customers. The IWM architectural module builds on the traditional concept of workload management where processing resources are dynamically assigned to tasks, or workloads, based on criteria such as business process priorities (for example, in balancing business intelligence queries against online transaction processing), resource availability, security protocols, or event scheduling, but extends the concept into the structure of individual workloads themselves.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc.

An "Intelligent Mobile Device" (IMD) is a mobile communication device and processing device. The phrase IMD may be used interchangeably and synonymously with the phrase "mobile device" herein and below. Moreover, a phone (often referred to as a "smart phone") is one type of IMD, as is a tablet and a PDA. The term "phone" and phrase "smart phone" may be used interchangeably and synonymously herein and below as well.

Various embodiments of this invention can be implemented in existing network architectures. For example, in some embodiments, the techniques presented herein are implemented in whole or in part in the Novell® operating system products, directory-based products, cloud-computing-based products, and other products distributed by Novell®, Inc., of Waltham, Mass.

Also, the techniques presented herein are implemented in machines, such as processor or processor-enabled devices. These machines are configured to specifically perform the processing of the methods and systems presented herein. Moreover, the methods and systems are implemented, programmed, and reside within a non-transitory computer-readable storage media or machine-readable storage medium and are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension only and is not intended to limit aspects of the invention.

It is within this context that embodiments of the invention are now discussed within the context of FIGS. 1-4.

Figure 1:
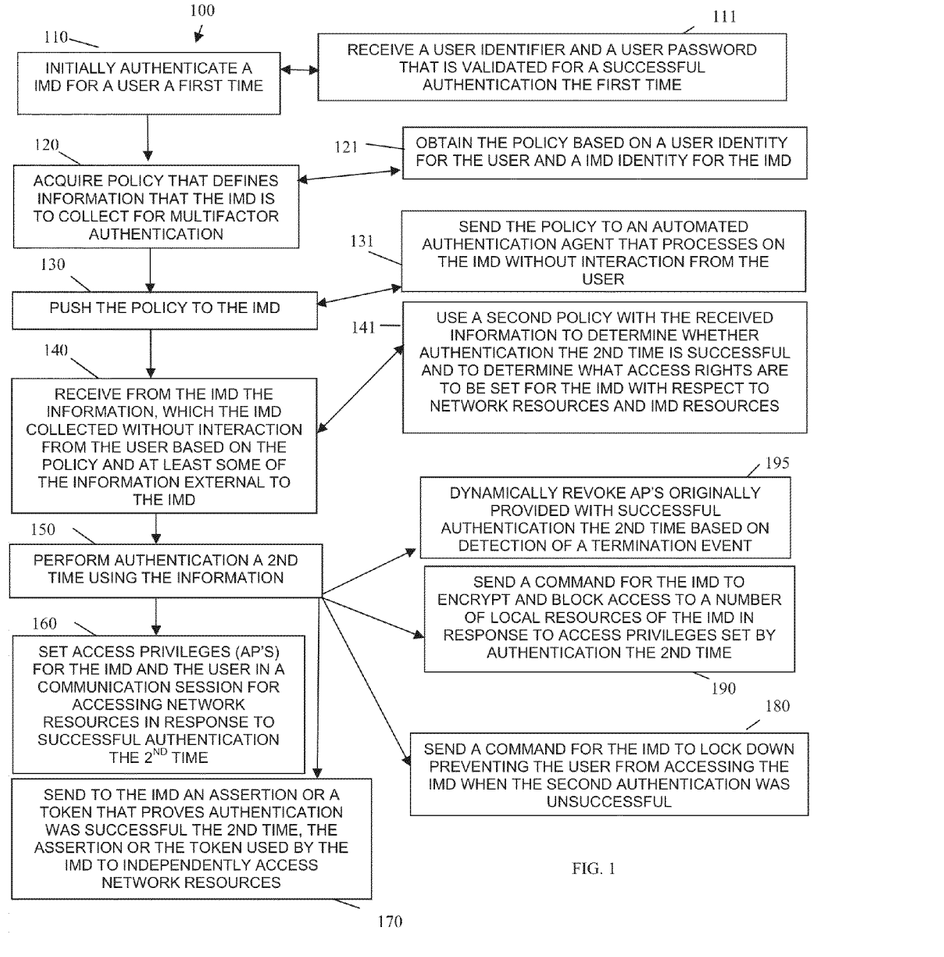
FIG. 1 is a diagram of a method for mobile device authentication, according to an example embodiment.

FIG. 1 is a diagram of a method 100 for mobile device authentication, according to an example embodiment. The method 100 (hereinafter "server authentication service") is implemented and programmed in a machine-accessible and non-transitory computer-readable medium as instructions that execute on one or more processors (machines, computers, processors, etc.). The machines are specifically configured to process the server authentication service. Furthermore, the server authentication service is operational over and processes within a wide-area network (WAN). The WAN may be wired, wireless, or a combination of wired and wireless. In an embodiment, the WAN is the Internet. In another embodiment, the network is a cellular phone network.

At 110, the server authentication service initially authenticates a mobile device for a user for a first or initial time. That is, the user is attempting to authenticate to the server authentication service over a network, such as a cellular network, via an IMD (cellular phone, etc.).

The server authentication service performs novel multifactor authentication but initial authentication occurs when the mobile device of the user is powered on or when the user actively tries to access a resource associated with the server authentication service.

According to an embodiment, at 111, the server authentication service receives a user identifier and user password combination, which is then validated for a successful authentication a first time. This means that the multifactor authentication processes when the user was successful with the initial user name and password authentication.

At 120, the server authentication service acquires policy that defines information that the mobile device (IMD) is to collect for purposes of completing multifactor authentication. The policy defines what types of information to collect and where to collect it.

In an embodiment, at 121, the server authentication service obtains the policy based on a user identity (acquired during the first successful authentication) and based on a mobile device (IMD) identity for the mobile device (also acquired either with the first successful authentication or with the initial request that precipitated the first authentication. That is, an IMD identity or serial code probably accompanies the request for the first authentication such that the IMD identity is acquired with the request. The IMD identity may also be acquired during the first successful authentication.

At 130, the server authentication service pushes the policy to the mobile device. The fact that the policy does not reside on the mobile device makes it more secure and less susceptible to compromise. Moreover, because the server authentication service dynamically pushes the policy to the mobile device after the first authentication is successful and controls the policy, the policy can change and be different with each request for multifactor authentication for the same user and same mobile device. Although this latter scenario does not have to always be the case, it can be achieved with the teachings presented herein.

In an embodiment, at 131, the server authentication service sends the policy to an automated authentication agent (discussed below with reference to the method 200 of the FIG. 2). The automated authentication agent processes on the mobile device without any interaction from the user. It may also be a hidden system application on the mobile device that cannot be removed by the user from the mobile device. This prevents tampering by the user with the policy once received because the automated authentication agent handles the received policy.

At 140, the server authentication service receives from the mobile device the information, which the mobile device collected. The information is collected without input or interaction from the user and is based on directives defined in the policy. Moreover, at least some of the information is external to the mobile device. That is, the mobile device follows directives of the policy to inspect the external physical environment of the mobile device for identifiers related to devices that are communicating via Blue Tooth, WiFi transmissions, Infrared transmissions, and the like with the mobile device or in the vicinity of the mobile device. In some cases, the mobile device may also be equipped with a Radio Frequency Identifier (RFID) reader to read RFID tags on the user or in the area of the user. These identifiers or other external information make up some of the information returned by the mobile device to the server authentication service.

According to an embodiment, at 141, the server authentication service uses a second policy with the received information to determine whether authentication the second time is to be successful and to determine what access rights are to be set for the mobile device with respect to network resources accessible to the mobile device over a network connection and with respect to existing mobile device resources located on the mobile device.

At 150, the server authentication service performs authentication a second time using the received information (multifactor authentication).

In one case, at 160, the server authentication service sets access privileges for the mobile device and the user in a communication session for accessing the network resources based on successful authentication the second time (multifactor authentication).

In another situation, at 170, the server authentication service sends to the mobile device an assertion or a token that proves authentication was successful the send time. The assertion or the token is then usable by the mobile device to independently access the network resources.

In yet another case, at 180, the server authentication service sends a command for the mobile device to lock down thereby preventing the user from accessing the mobile device when the second authentication was unsuccessful.

In another scenario, at 190, the server authentication service sends a command for the mobile device to encrypt and block access to a number of local resources of the mobile device in response to or based on the access privileges set by the authentication the second time. So, some resources may be shut down or inaccessible because parts of the expected information returned was missing or unacceptable.

In another situation, at 195, the server authentication service dynamically revokes the access privileges originally provided with successful authentication the second time based on detection of a termination event.

Figure 2:
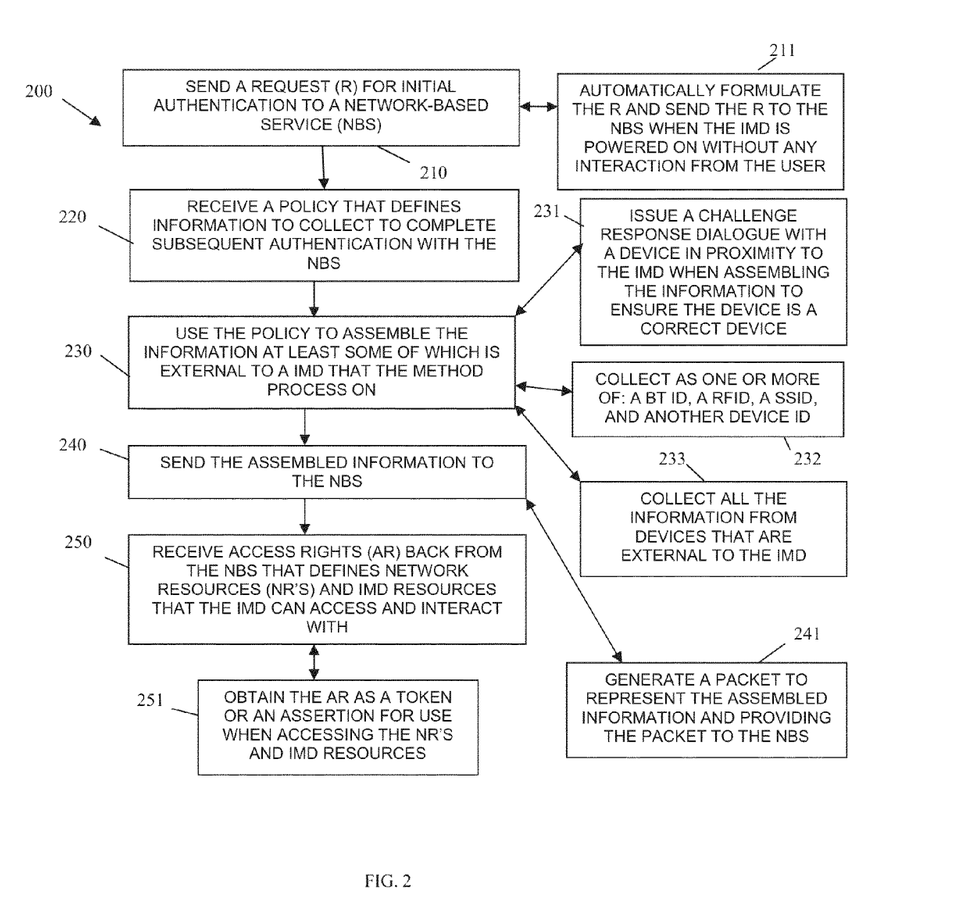
FIG. 2 is a diagram of another method for mobile device authentication, according to an example embodiment.

FIG. 2 is a diagram of another method 200 for mobile device authentication, according to an example embodiment. The method 200 (hereinafter "mobile device authentication service") is implemented and programmed within a machine-accessible and non-transitory computer-readable medium as instructions that execute on one or more processors (machines, computers, processors, etc.). The machine is specifically configured to process the mobile device authentication service. Furthermore, the mobile device authentication service is operational over and processes within a wide-area network (WAN). The WAN may be wired, wireless, or a combination of wired and wireless. In an embodiment, the WAN is the Internet. In another embodiment, the network is a cellular network.

The server authentication service represented by the method 100 of the FIG. 1 is presented from the perspective of an external network-based identity service or authentication service that interacts with a mobile device to perform novel authentication. The mobile device authentication service is presented from the perspective of an agent on a mobile device that interacts with the server authentication service of the method 100 to facilitate authentication of the mobile device. So, in this sense, the mobile device authentication service interacts with the server authentication service.

At 210, the mobile device authentication service sends a request for initial authentication to a network-based service, such as the server authentication service, represented by the method 100 of the FIG. 1.

According to an embodiment, at 211, the mobile device authentication service automatically formulates the request and sends the resource to the network-based service when the mobile device (IMD) is powered on without any interaction of the user. So, the mobile device can be configured to automatically request authentication when powered on. In some cases, a period configured by policy can trigger the mobile device to periodically and automatically contact the mobile device authentication service for authentication.

It is noted that in other cases, the user affirmatively accesses services of the mobile device to request the initial authentication of the mobile device authentication service.

At 220, the mobile device authentication service receives a policy that defines information to collect to complete a subsequent authentication (multifactor authentication) with the network-based service.

At 230, the mobile device authentication service uses the policy to assemble the information where at least some of the information is external to the mobile device that the mobile device authentication service executes or processes on.

According to an embodiment, at 231, the mobile device authentication service issues a challenge response dialogue with a device in proximity to the mobile device when assembling the information to ensure the device being challenged is a correct device defined by the policy. In some situations, the policy may require the challenge response dialogue with some devices.

In an embodiment, at 232, the mobile device authentication service collects the information as one or more of: a Blue Tooth identifier (ID) for a Blue Tooth device in proximity to the mobile device, a RFID tag located on clothing or devices of the user, a SSID accessible on a WiFi network to the mobile device, and another device identifier for a device capable of communicating with the mobile device. This scenario is described in greater detail below with reference to the FIG. 4.

In an embodiment, at 233, the mobile device authentication service collects all the information (not just some) from devices that are external to the mobile device.

At 240, the mobile device authentication service sends the assembled information to the network-based service to complete multifactor authentication on the mobile device.

According to an embodiment, at 241, the mobile device authentication service generates a packet to represent the assembled information and provides the packet back to the network-based service.

At 250, the mobile device authentication service receives access rights back from the network-based service that defines network resources and mobile device resources that the mobile device can access and interact with.

In one situation, at 251, the mobile device authentication service obtains the access rights as a token or an assertion for use when the mobile device directly interacts with and accesses the network resources and the mobile device resources.

Figure 3:
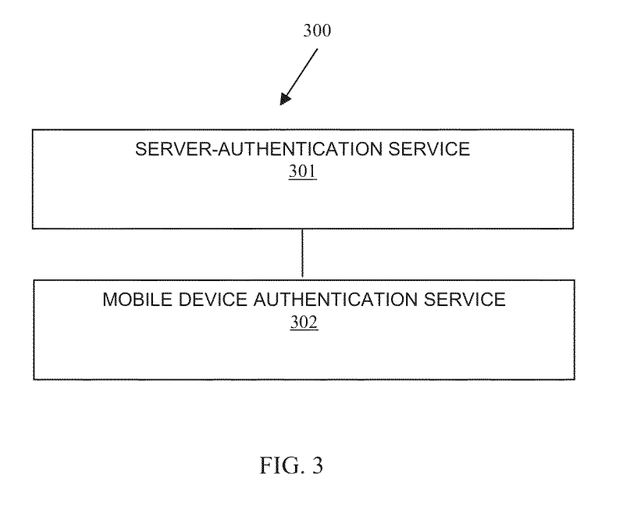
FIG. 3 is a diagram of mobile device authentication system, according to an example embodiment.

FIG. 3 is a diagram of mobile device authentication system 300, according to an example embodiment. The mobile device authentication system 300 is implemented in a machine-accessible and non-transitory computer-readable medium as instructions that execute on multiple processors (machines, computers, processors, etc.). The machines are specifically configured to process the mobile device authentication system 300. Furthermore, the mobile device authentication system 300 is operational over and processes within a wide-area network (WAN). The WAN may be wired, wireless, or a combination of wired and wireless. In an embodiment, the WAN is the Internet. In an embodiment, the network is a cellular network.

In an embodiment, the mobile device authentication system 300 implements, inter alia, the methods 100 and 200 of the FIGS. 1 and 2, respectively.

The mobile device authentication system 300 includes a server authentication service 301 and a mobile device authentication service 302. Each of these components and their interactions with one another will now be described below in turn.

The server authentication service 301 is configured and programmed as instructions within a non-transitory computer-readable storage medium and executes on one or more processors. The one or more processors are specifically configured to execute the server authentication service 301. Example processing associated with the server authentication service 301 was discussed above with reference to the method 100 of the FIG. 1.

The server authentication service 301 is configured to perform a first authentication on the mobile device and then push policy to the mobile device authentication service 302. The mobile device authentication service 302 is configured to evaluate the directives of the policy and gather external information that is external to the mobile device. The mobile device authentication service 302 is configured to assemble and provide back to the server authentication service 301 the external information.

The server authentication service 301 is also configured to perform a second authentication (multifactor authentication) on the mobile device in response to or based on the assembled and provided back information. The server authentication service 301 based on the second authentication sets access privileges for the mobile device with respect to accessing network resources and mobile device resources. The access privileges are then sent by the server authentication service 301 to the mobile device via the mobile device authentication service 302.

According to an embodiment, the server authentication service 301 is configured to send the access privileges to the mobile device authentication service 302 as a token or as an assertion.

In another case, the server authentication service 301 is configured to dynamically revoke in real time the token or the assertion based on a detection of a terminating event.

The mobile device authentication service 302 is configured and programmed as instructions within a non-transitory computer-readable medium and executes on one or more processors. The one or more processors are specifically configured to execute the mobile device authentication service 302.

Example processing associated with the mobile device authentication service 302 was discussed above with reference to the method 200 of the FIG. 2.

The mobile device authentication service 302 is configured interact with the server authentication service 301 to perform an initial authentication and receive policy that defines external information that is external to the mobile device that the mobile device authentication service 302 is to assemble and package and supply back to the server authentication service 301 for purposes of a second authentication (multifactor authentication). The mobile device authentication service 302 is then configured to receive access privileges back from the server authentication service 301 defining access rights to network resources and mobile device resources.

Figure 4:
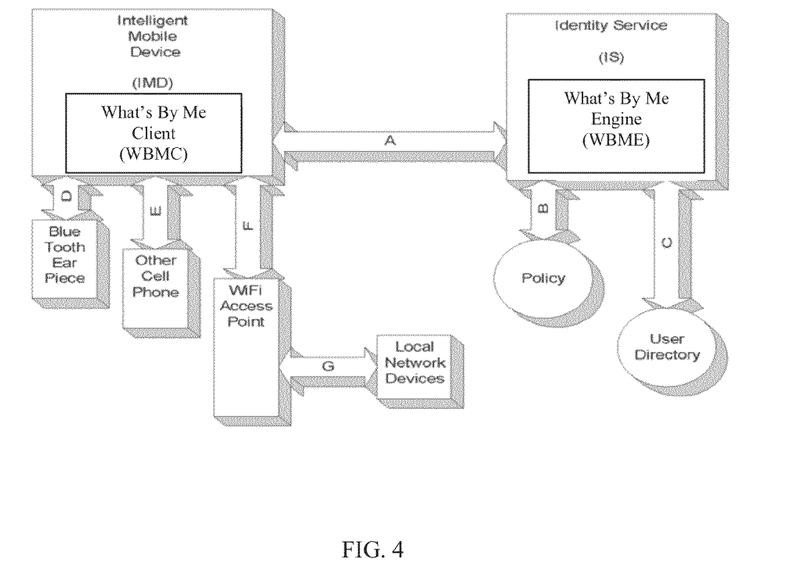
FIG. 4 depicts an example architecture for mobile device authentication, according to an example embodiment.

FIG. 4 depicts an example architecture for mobile device authentication, according to an example embodiment. It is noted that the architecture shown in the FIG. 4 is presented for purposes of illustration only as other components or less components can be used to realize the teachings presented herein. Therefore, the specific illustration of the FIG. 4 is not intended to limit the teachings in any manner.

The embodiments presented herein solve issues associated with multifactor authentication of mobile devices to remove services, such as IWD (but not limited thereto) by creating a new and novel way to use multi-factor authentication without requiring the user to do anything other than input their name and password (initial single factor authentication).

The basic principles of authentication are based on "what I KNOW" (e.g., password . . . ), what I AM" (e.g., fingerprint . . . ), and "what I HAVE" (e.g., smart-card . . . ). The embodiments presented herein build on these concepts and add the idea of what is close to me. Most IMD's have the ability to communicate with external devices. The techniques herein build on this fact to offer policy based multifactor authentication to the mobile device (IMD) when authenticating to a external system such as IWM system. The four most common methods of communication by the IMD are Cell phone carrier signals, Global Positioning Satellite (GPS), Blue-tooth, and WiFi. The techniques use one or more of these wireless communications to discover the things around the IMD and use them as input to a novel authentication process. The techniques allow the IMD to offer advanced multifactor authentication without requiring the user to input additional data. The technique builds a packet of data that includes of list of "What is By Me" (WBM). Much of the data used by the technique may be difficult for a thief to know about or obtain. The additional data in the WBM packet is sent by the IMD, and is be used by policy on the identity service to determine if the authentication is valid. The authentication data and the WBM packet could include the ID of a blue-tooth ear piece worn by the owner of the IMD, the ID of a Nike blue-tooth shoe worn by the owner of the IMD, the blue-tooth ID of the owner's car, other IMD, other cell phones and any other type of device that the valid user has and is defined by policy to use. The detection of devices is not limited to blue-tooth but can include WiFi to detect Service Set Identifier (SSID), routers, and other devices on the network that are visible and other devices physically or logically close to the IMD. In some cases, the IMD reads RFID tags, this allows the IMD to authenticate only if the right tag is on the user's clothing, wallet, shoes, keychain, or other article possessed by the user.

As an additional method of protection for the WBM information that is being sent from the IMD, from being observed, the data sent may be encrypted using encryption algorithms.

Many factors and types of data that describe things near (local physical proximity) the user are sent to the identity service in the WBM packet, this data is used to authenticating the user. This service uses policy to validate authentication. The service may be a process running at the site of the process or it may be a service offered by a cloud vendor. It can also be used by having the IMD act as the authentication service itself. This can be used to allow the IMD to only be unlocked if the right blue-tooth ear piece or other devices are within range.

The first part of the authentication is completed against the identity service. It is of some import to use an identity service because authentication is being performed so a password or other credentials are used to decide which IMD factors will provide the WBM data for authentication. The technique takes an approach of locating the device(s) and validating their "closeness" (physical proximity or network location proximity) to the IMD silently. This may be done with one or more devices. The approach is taking valid user authentication credentials, doing a silent validation of other nearby devices, building a "What's By Me" (WBM) packet, and sending both to the identity service. The technique does not give access unless it has the IDs of the other devices, required by policy, near or available to the IMD.

The approach takes the standard authentication against the identity service and depending on the user and credentials, it may require different device IDs to be included in the WBM data. This provides a silent additional form of authentication that helps give a higher level of security to the IMD authenticating to the identity service. The data is used by the policy engine at the identity service to determine if the requirements for authentication are met. Policy may also set levels of authentication or roles based on the information contained in the WBM packet.

Policy may allow a fall back if the other policy required device(s) are not available to the identity service via the IMD. This fall back may be a challenge response or other advances forms of authentication.

An example flow of the approach depicted in the FIG. 4 proceeds as follows:

The user starts the authentication process by requesting authentication from the "What's By Me Client" (WBMC) on the "Intelligent Mobile Device" (IMD). The WBMC can use local policy or get policy from the IS via (A).

The policy defines what forms of authentication can be used. This may include a list of types and channels to use to find devices close to the authenticating IMD. Some examples are: name and password, blue tooth devices in range, WiFi SSID, or local devices seen on the network via WiFi.

The WBMC uses this list to query for devices close to IMD. The drawing shows blue tooth (D) used to get the device ID from an ear piece used by the phone (IMD). (E) shows blue tooth being used to validate that there is a unique phone within range and obtaining its ID. (F) shows WiFi used to validate the SSID is within the range of the phone. (G) uses the WiFi connection (F) to check for the presence of a device on the local network. This may be a device that is only available inside the firewall for example. If the phone is equipped with a Radio Frequency Identifier (RFID) reader, it could be use to find all RFID tag close to it (not shown).

All of the information entered by the user and information about things around IMD are then combined into a packet of data by the WBMC. This packet may be encrypted by the WBMC using the public key of the IS or some other method to protect the data from being monitored.

The WBMC then sends this Packet to the IS via (A). The "What's By Me Engine" (WBME) on IS is then executed and receives the packet. If user credentials are included in the packet, they are validated against a user store (C). If invalid, an authentication failure is returned otherwise the WBME process continues.

The authentication policy is retrieved via (B) by the WBME. The policy may be unique for each user or based on roles and other user attributes. The policy describes the device ID's that must be in the packet to authenticate.

In addition, the policy may describe the device ID that causes additional roles to be set for the user. This can allow the user to have more or less rights based on what is around the user's IMD.

If the policy requirements are met, the user is authenticated at the IS. The IS returns a valid authentication message to the WBMC via the IMD and (A). This can be a simple statement or more likely is a Token that includes roles, attributes and other signed data. An Security Assertion Markup Language (SAML) token may be an example token type that is to be sent back to the IMD via (A).

This token can be used to unlock the IMD, gain access to a IWM system, or used to broker it for another token via a Station-To-Station (STS) protocol to use elsewhere.

This protects the system that uses the IMD as an interface for management. This approach can be used to only allow access if the IMD is in a protected environment.

It can also be used to prevent stolen IMD from being accessed. When an IMD is stolen it is unlikely that the thief will be able to get all the devices that a valid user may have access to.

The approaches can also obtain more information from the Blue Tooth device other than an ID. This involves loading code on the blue tooth device to supply such desired addition information.

An example may include using a laptop as a validating device. Not only would the IMD use the WBMC to validate the device ID of the laptop but it can issue a challenge response to the laptop. The challenge can come from and be validated by the WBME or the WBMC.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors configured to perform the method, comprising:
   initially authenticating a mobile device for a user a first time;
   acquiring policy that defines information that the mobile device is to collect for multifactor authentication, the policy also defines types of information to collect for the mobile device and where the mobile device can collect those types of information;
   dynamically pushing the policy to the mobile device;
   receiving from the mobile device the information, which the mobile device collected without interaction from the user based on the policy and at least some of the information external to the mobile device for an external physical environment of the mobile device that captures identifiers for other devices that are communicating with the mobile device; and
   performing authentication a second time using the information, and changing the policy ensuring that the policy is different for a next multifactor authentication for the user a subsequent time after the first time.

2. The method of claim 1 further comprising, setting access privileges for the mobile device and the user in a communication session for accessing network resources in response to successful authentication the second time.

3. The method of claim 1 further comprising, sending to the mobile device an assertion or a token that proves authentication was successful the second time, the assertion or the token used by the mobile device to independently access network resources.

4. The method of claim 1 further comprising, sending a command for the mobile device to lock down preventing the user from accessing the mobile device when the second authentication was unsuccessful.

5. The method of claim 1 further comprising, sending a command for the mobile device to encrypt and block access to a number of local resources of the mobile device in response to access privileges set by authentication the second time.

6. The method of claim 1 further comprising, dynamically revoking access privileges originally provided with successful authentication the second time based on detection of a termination event.

7. The method of claim 1, wherein said initially authenticating further includes receiving a user identifier and a user password that is validated for a successful authentication the first time.

8. The method of claim 1, wherein said acquiring further includes obtaining the policy based on a user identity for the user and a mobile device identify for the mobile device.

9. The method of claim 1, wherein said pushing further includes sending the policy to an automated authentication agent that processes on the mobile device without interaction from the user.

10. The method of claim 1, wherein said performing authentication the second time further includes using a second policy with the received information to determine whether authentication the second time is successful and to determine what access rights are to be set for the mobile device with respect to network resources and mobile device resources.

11. A method implemented in a non-transitory machine-readable storage medium and processed by one or more processors of a mobile device configured to perform the method, comprising:
   sending, by the mobile device, a request for initial authentication of the mobile device to a network-based service;
   receiving, by the mobile device, a policy that defines information to collect to complete subsequent authentication with the network-based service, the policy defining the types of information to collect and where that information is to be collected for the mobile device;
   using, by the mobile device, the policy to assemble the information at least some of which is external to the mobile device that the method processes on, wherein the at least some information includes inspecting, by the mobile device, an external physical environment of the mobile device based on other devices in communication with the mobile device via Bluetooth, WiFi, or Infrared transmission;
   sending, by the mobile device, the assembled information to the network-based service; and
   receiving, by the mobile device, access rights back from the network-based service that defines network resources and mobile device resources that the mobile device can access and interact with.

12. The method of claim 11, wherein said sending further includes automatically formulating the request and sending the request to the network-based service when the mobile device is powered on without any interaction from the user.

13. The method of claim 11, wherein said using further includes issuing a challenge response dialogue with a device in proximity to the mobile device when assembling the information to ensure the device is a correct device.

14. The method of claim 11, wherein said using further includes collecting at least some of the information as one or more of: a blue tooth identifier for a blue tooth device in proximity to the mobile device, a radio frequency identifier (RFID) located on something in proximity to the mobile device, a service set identifier (SSID) of a device connected to a wireless network in proximity to the mobile device, and another device identifier to another device in proximity to the mobile device.

15. The method of claim 11, wherein said sending further includes generating a packet to represent the assembled information and providing the packet to the network-based service.

16. The method of claim 11, wherein said receiving further includes obtaining the access rights as a token or an assertion for use when accessing the network resources and mobile device resources.

17. A multi-processor implemented system, comprising:
a server-authentication service configured and programmed on a non-transitory computer-readable medium and to execute on one or more processors of a server machine; and
a mobile device authentication service configured and programmed on a non-transitory computer-readable medium and to execute on one or more of the processors of a mobile device;
the server-authentication service is configured to perform a first authentication on the mobile device and push policy to the mobile device authentication service to gather external information that is external to the mobile device by inspecting an external physical environment of the mobile device for other devices communicating with the mobile device using Bluetooth, WiFi, or Infrared wireless communications, the mobile device authentication service is configured to assemble and provide back to the server-authentication service the external information, the server-authentication service further configured to perform a second authentication on the mobile device in response to the assembled and provided back information and based thereon set access privileges for the mobile device with respect to accessing network resources and mobile device resources, the access privileges sent to the mobile device authentication service.

18. The system of claim 17, wherein the server-authentication service is to send the access privileges to the mobile device authentication service as a token or an assertion.

19. The system of claim 18, wherein the server-authentication service is configured to revoke the token or the assertion based on detection of a terminating event.

* * * * *

UNITED STATES PATENT AND TRADEMARK OFFICE
CERTIFICATE OF CORRECTION

PATENT NO.        : 8,639,926 B2                              Page 1 of 1
APPLICATION NO.   : 12/915816
DATED             : January 28, 2014
INVENTOR(S)       : Brown et al.

It is certified that error appears in the above-identified patent and that said Letters Patent is hereby corrected as shown below:

In the Claims

In column 10, line 29, in Claim 8, delete "identify" and insert --identity--, therefor In column 11, line 9, in Claim 14, delete "blue tooth" and insert --bluetooth--, therefor In column 11, line 9, in Claim 14, delete "blue tooth" and insert --bluetooth--, therefor Signed and Sealed this
Twenty-second Day of April, 2014

Michelle K. Lee
*Deputy Director of the United States Patent and Trademark Office*